United States Patent Office 3,144,451
Patented Aug. 11, 1964

3,144,451
ETHYLENEDIAMINE DERIVATIVE
Martin A. Davis, Montreal, Quebec, Canada, assignor to American Home Products Corporation, New York, N.Y., a corporation of Delaware
No Drawing. Filed July 27, 1961, Ser. No. 127,157
3 Claims. (Cl. 260—243)

This invention relates to a new pharmacologically-active derivative of ethylenediamine, and to the method by which it may be prepared from available starting materials.

My new compound, 2-[(dimethylaminoethyl)methylamino] ethyl phenothiazine-10-carboxylate, both in base form and in the form of its acid addition salts with pharmaceutically acceptable acids, particularly the dihydrochloride salt, is a potent antitussive agent and has important local anesthetic action. Its toxicity appears to be of a relatively low order.

As a local anesthetic the compound in the form of one of its water-soluble salts might be administered in a 1–2 percent aqueous solution for topical application.

As an antitussive medication it may be administered in the form of one of its water-soluble salts in solid dosage forms such as tablets or capsules containing an excipient such as, for example, lactose, a distintegrating agent such as, for example, starch, and a lubricant such as, for example, magnesium stearate, or in liquid preparations such as syrups, which may advantageously contain expectorant and secretolytic additives, such dosage forms to contain from 10 to 50 mg. of the active compound per dosage unit.

The new compound, 2-[(dimethylaminoethyl)methylamino] ethyl phenothiazine-10-carboxylate, has the structural formula:

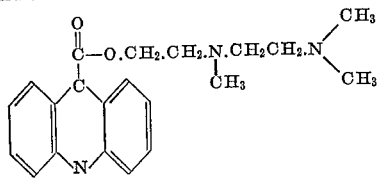

It may be prepared by the interaction of phenothiazine-10-carboxylic acid chloride with N-hydroxyethyl-N,N',N'-trimethylethylenediamine in an acid-binding solvent, preferably pyridine.

The basic alcohol used as intermediate, N-hydroxyethyl-N,N',N'-trimethylethylenediamine, may be readily prepared by heating together 2-chloroethanol and N,N',N'-trimethylethylenediamine in an appropriate solvent, as, for example, in ethanol.

Further details of these procedures will be found in the appended illustrative examples.

EXAMPLE 1

*N-Hydroxyethyl-N',N'-Trimethylethylenediamine*

A solution of 2-chloroethanol (8.1 g., 0.1 mole) in absolute ethanol (10 ml.) was added dropwise to a solution of N,N',N'-trimethylethylenediamine (20.4 g., 0.2 mole) in ethanol (70 ml.). The mixture was heated under reflux for twenty hours, the ethanol removed in vacuo, i.e., at a pressure less than atmospheric, and the residue was treated with concentrated sodium hydroxide solution. The liberated oil was taken up in benzene, the organic layer dried and evaporated and the residue distilled to give 7.7 g. (53% yield) of an oil; B.P. 96–100° C./19 mm.; $n_D^{25}$ 1.4500. The product was N-hydroxyethyl-N,N',N'-trimethylethylenediamine.

A portion of this base in ethanol was treated with an excess of hydrogen chloride. Recrystallization of the salt obtained from ethanol-ether furnished a sample of N-hydroxyethyl-N,N',N'-trimethylethylenediamine dihydrochloride, M.P. 199–201° C' (decomp.).

Analysis confirmed the empiric formula $C_7H_{20}Cl_2N_2O$.
Required: Cl, 32.35, N, 12.78%. Found: Cl, 32.79, 32.81; N, 12.95, 12.47%.

EXAMPLE 2

*2-[(Dimethylaminoethyl)Methylamino]Ethyl Phenothiazine-10-Carboxylate*

A solution of the basic alcohol described in Example 1 (7.5 g., 0.051 mole) in an equal volume of dry pyridine was added dropwise to a slurry of phenothiazine-10-carboxylic acid chloride (13.4 g., 0.051 mole), in pyridine (20 ml.). The mixture was stirred at room temperature for one hour, and subsequently held between 80° C. and 90° C. for forty minutes.

The cooled mixture was then poured into ice-water, the mixture rendered alkaline by the addition of sodium carbonate, and the gum which deposited was collected and washed several times with water. It was then dissolved in benzene and the solution was again washed with water to remove the last traces of pyridine. The benzene was evaporated and the dark-colored residue was treated with charcoal in benzene-hexane mixture. Evaporation left 15.6 g. (82% yield) of an amber oil. This was 2-[(dimethylaminoethyl)methylamino]ethyl phenothiazine-10-carboxylate.

This oil was dissolved in aqueous methanol and the solution was made acidic, by the addition of concentrated hydrochloric acid. Addition of acetone, with subsequent recrystallization of the resulting precipitate from aqueous ethanolacetone mixture, gave a sample of the dihydrochloride of 2-[(dimethylaminoethyl)methylamino]ethyl phenothiazine-10-carboxylate, characterized by its U.V. absorption spectrum λ max. 228 mμ, ε=22,500, and λ max. 256 mμ, ε=8,025. Its melting point was 236–237° C. (decomp.).

Analysis confirmed the empiric formula

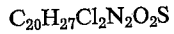

Required: C, 54.05; H, 6.12; Cl, 15.95; N, 9.46%.
Found: C, 53.93; H, 5.99; Cl, 15.93, 15.80; N, 8.97, 8.92%.

I claim:
1. A compound selected from the group which consists of 2-[(dimethylaminoethyl)methylamino]ethyl phenothiazine-10-carboxylate and its dihydrochloride salt.
2. 2-[(dimethylaminoethyl)methylamino]ethyl phenothiazine-10-carboxylate.
3. The dihydrochloride salt of 2-[(dimethylaminoethyl)methylamino]ethyl phenothiazine-10-carboxylate.

References Cited in the file of this patent
UNITED STATES PATENTS
2,951,077 Myers et al. ———————— Aug. 30, 1960

FOREIGN PATENTS
198,697 Austria ———————— July 25, 1958
708,896 Great Britain ———————— May 12, 1954
1,018,868 Germany ———————— Nov. 7, 1957
1,036,259 Germany ———————— Aug. 14, 1958
1,036,260 Germany ———————— Aug. 14, 1958
1,040,032 Germany ———————— Oct. 2, 1958
1,040,033 Germany ———————— Oct. 2, 1958

OTHER REFERENCES
Dahlbom et al.: Acta Pharmacol. et Toxicol., vol. 9, pp. 168–178 (1953).
Chappel et al.: Canadian J. Biochem. and Physiol., vol. 36, pp. 475–481 (1958).

UNITED STATES PATENT OFFICE
CERTIFICATE OF CORRECTION

Patent No. 3,144,451                                August 11, 1964

Martin A. Davis

It is hereby certified that error appears in the above numbered patent requiring correction and that the said Letters Patent should read as corrected below.

Column 1, lines 35 to 42, the formula should appear as shown below instead of as in the patent:

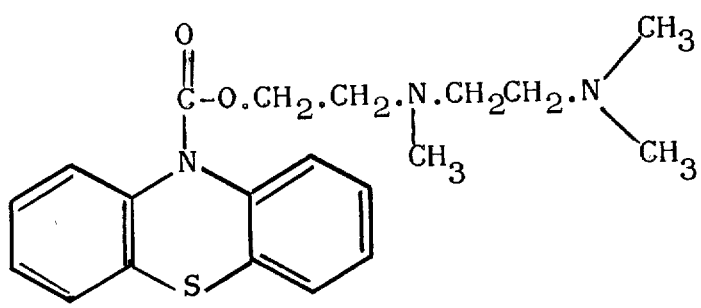

same column 1, line 72 and column 2, line 1, for "N-hydroethyl" read -- N-hydroxyethyl --.

Signed and sealed this 9th day of February 1965.

(SEAL)
Attest:

ERNEST W. SWIDER                               EDWARD J. BRENNER
Attesting Officer                               Commissioner of Patents